United States Patent
Ho et al.

(10) Patent No.: US 10,336,054 B2
(45) Date of Patent: Jul. 2, 2019

(54) ALIGNMENT METHOD FOR 3D PRINTER

(71) Applicants: XYZPRINTING, INC., New Taipei (TW); KINPO ELECTRONICS, INC., New Taipei (TW)

(72) Inventors: Ming-En Ho, New Taipei (TW); Yi-Chu Hsieh, New Taipei (TW); Chun-Hsiang Huang, New Taipei (TW); Jia-Yi Juang, New Taipei (TW); Yang-Teh Lee, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 189 days.

(21) Appl. No.: 15/406,645

(22) Filed: Jan. 13, 2017

(65) Prior Publication Data

US 2018/0079150 A1    Mar. 22, 2018

(30) Foreign Application Priority Data

Sep. 21, 2016 (CN) .......................... 2016 1 0836407

(51) Int. Cl.
*B33Y 10/00* (2015.01)
*B33Y 50/02* (2015.01)
(Continued)

(52) U.S. Cl.
CPC ............ *B33Y 50/02* (2014.12); *B29C 64/106* (2017.08); *B29C 64/112* (2017.08);
(Continued)

(58) Field of Classification Search
CPC ..... B33Y 50/02; B33Y 10/00; B29C 67/0055; B29C 67/0059; B29C 67/0088;
(Continued)

(56) References Cited

U.S. PATENT DOCUMENTS

| 6,483,596 | B1 | 11/2002 | Philippi et al. | |
| 2006/0061613 | A1* | 3/2006 | Fienup | B41J 2/16532 347/19 |
| 2018/0036949 | A1* | 2/2018 | Lopez | B33Y 30/00 |

OTHER PUBLICATIONS

Office Action dated Jan. 2, 2019 of the corresponding Korean patent application.

* cited by examiner

*Primary Examiner* — Anthony Calandra
*Assistant Examiner* — S. Behrooz Ghorishi
(74) *Attorney, Agent, or Firm* — Chun-Ming Shih; HDLS IPR Services

(57) ABSTRACT

An alignment method adopted by a 3D printer having a 3D nozzle for jetting material and a 2D pen-module for jetting colored ink is disclosed. The 3D printer first controls the 3D nozzle to print an alignment template on a printing platform, wherein the alignment template comprises multiple alignment blocks respectively and separately printed along an axis, and each alignment block respectively deviates from each center-line according to an accumulated offset. Next, the 3D printer controls the 2D pen-module to print an ink matrix on the alignment template, wherein the ink matrix comprises multiple ink blocks respectively and separately printed along the same axis, and each ink block is exactly corresponding to each center-line respectively. The 3D printer uses covering status of each alignment block and each ink block to determine a deviation between the 3D nozzle and the 2D pen-module, so as to perform an alignment action thereupon.

15 Claims, 9 Drawing Sheets

(51) Int. Cl.
 *B41J 3/407* (2006.01)
 *B29C 64/106* (2017.01)
 *B29C 64/112* (2017.01)
 *B29C 64/165* (2017.01)
 *B29C 64/386* (2017.01)
(52) U.S. Cl.
 CPC ........... *B29C 64/386* (2017.08); *B41J 3/4073* (2013.01); *B29C 64/165* (2017.08); *B33Y 10/00* (2014.12)
(58) Field of Classification Search
 CPC . B29C 67/0081; B29C 64/112; B29C 64/386; B29C 64/106; B29C 64/165; B41J 11/008; B41J 3/4073; B29K 2105/005
 See application file for complete search history.

ALIGNMENT METHOD FOR 3D PRINTER

BACKGROUND OF THE INVENTION

1. Technical Field

The technical field relates to an alignment method, and specifically to an alignment method for a 3D printer.

2. Description of Prior Art

According to the maturity of the development of 3D printing technology and also the narrowed size and reduced price of 3D printers, the 3D printers are growing and becoming popular very quickly these years.

A regular 3D printer is mainly arranged with a 3D nozzle for jetting material, so as to print an object by way of stacking the jetted material upon a printing platform. However, most of the present 3D printers can only print monochromatic object (i.e., the color of the object equals to that of the material).

In order to add the color to the printed object, a new type of 3D printer arranged with a nozzle set is provided in the market. In particular, the nozzle set is integrated with the aforementioned 3D nozzle and a 2D pen-module used to be adopted in traditional 2D printers for jetting color-ink. The 2D pen-module is arranged with multiple ink cartridges for different colors of inks and multiple pens respectively corresponding to each of the ink cartridges, so the 2D pen-module can jet inks of different colors.

By using the aforementioned nozzle set, the current 3D printer in related art can jet ink of specific color on printed material through the 2D pen-module right after the material is printed by the 3D nozzle. Therefore, the printed object will be a colored-object decorated with user demanding colors.

However, the nozzle set is built by integrating separate 3D nozzle and 2D pen-module, the 3D nozzle and the 2D pen-module may deviate from each other and cause a deviation due to the installation or the movement of the nozzle set. As mentioned above, this type of 3D printer is to jet the colored ink on the printed material for reaching the goal of coloring, if a deviation exists between the 3D nozzle and the 2D pen-module, the coloring of the printed object will fail, and the object will be unacceptable to user.

SUMMARY OF THE INVENTION

The disclosure is directed to an alignment method for a 3D printer, which aligns a 3D nozzle for jetting material and a 2D pen-module for jetting colored ink of the 3D printer, so as to keep the 3D nozzle and the 2D pen-module to locate at same printing datum.

In one of the exemplary embodiments, the alignment method is adopted by the 3D printer to first control the 3D nozzle to print an alignment template on a printing platform, wherein the alignment template comprises multiple alignment blocks respectively and separately printed along an axis, and each alignment block respectively deviates from each center-line according to an accumulated offset. Next, the 3D printer controls the 2D pen-module to print an ink matrix on the alignment template, wherein the ink matrix comprises multiple ink blocks respectively and separately printed along the same axis, and each ink block is exactly corresponding to each center-line respectively. The 3D printer uses covering status of each alignment block and each ink block to determine a deviation between the 3D nozzle and the 2D pen-module, so as to perform an alignment action thereupon.

In one aspect of the present invention, the 3D nozzle and the 2D pen-module of the 3D printer are respectively printing two different types of blocks upon same locations, one of which is deviating from each center-line of each printed location, and the other is exactly corresponding to each center-line of each printed location. Therefore, an accumulated offset adopted by one of the alignment blocks which is completely covered by corresponding one of the ink blocks may be used to determine a deviation between the 3D nozzle and the 2D pen-module. As a result, the 3D printer may use the determined deviation to perform an alignment action to the 3D nozzle and/or the 2D pen-module, so as to keep the 3D nozzle and the 2D pen-module to locate at same printing datum.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims of the present invention.

Figure 1:
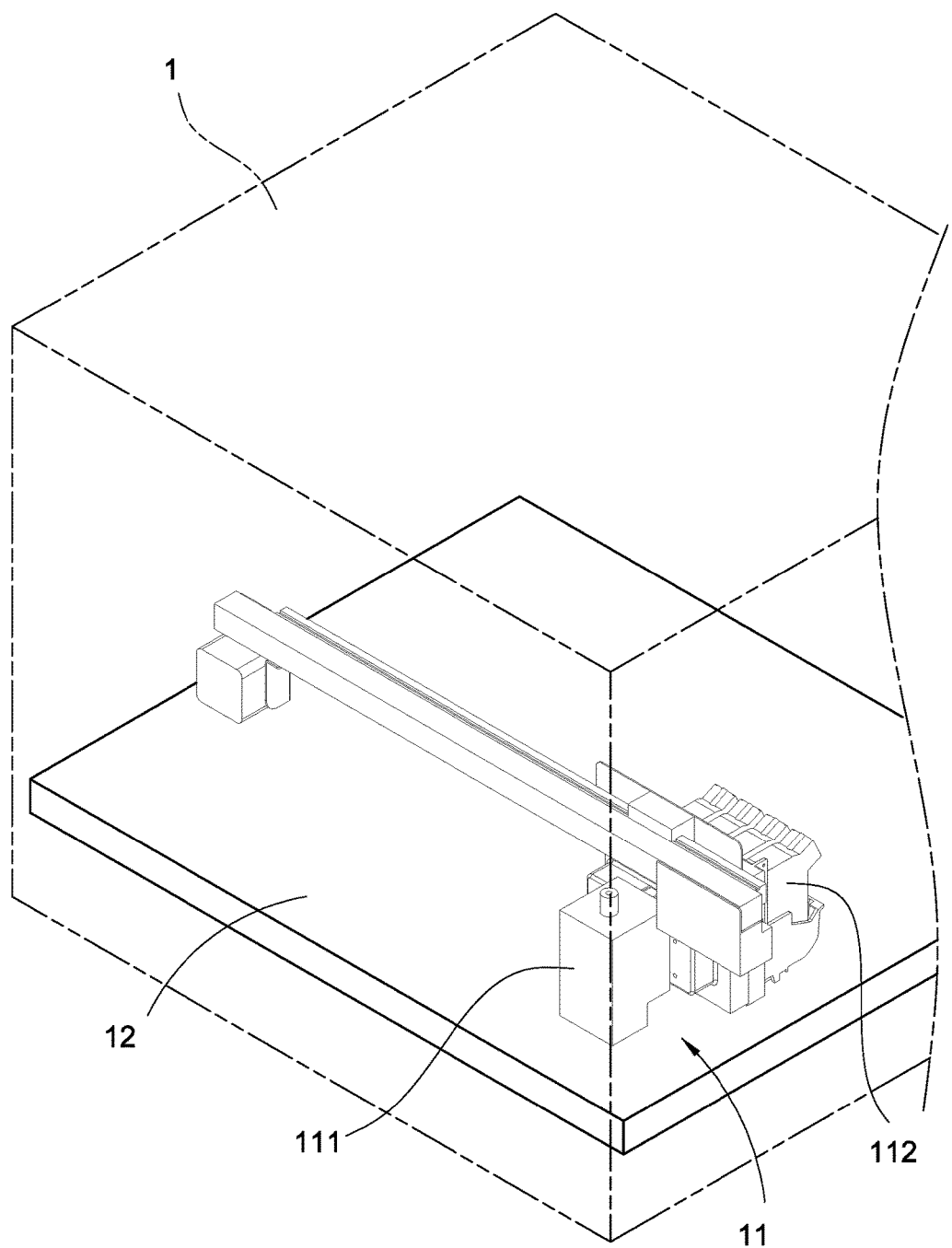
FIG. 1 is a schematic view of a 3D printer according to one embodiment of the present disclosure.

FIG. 1 is a schematic view of a 3D printer according to one embodiment of the present disclosure. In one aspect of the present invention, an alignment method for 3D printer is disclosed and adopted by a 3D printer 1 shown in FIG. 1 (refers to as the printer 1 hereinafter). In particular, FIG. 1 uses a fused deposition modeling (FDM) type 3D printer as an example, however, the alignment method in each aspect of the present invention is adoptable by any type of 3D printer which comprises two or more nozzles (one of which is used for jetting material and another one is used for jetting colored ink on the material), not limited to the FDM type 3D printer as shown in FIG. 1.

The printer 1 in FIG. 1 comprises a nozzle set 11 and a printing platform 12, wherein the nozzle set 11 includes a 3D nozzle 111 for jetting material of a 3D model and a 2D pen-module 112 for jetting inks of different colors. In one aspect, the printer 1 jets the material on the printing platform 12 through the 3D nozzle 11, and jets inks of different colors on the printed material through the 2D pen-module 112, so as to color the printed material. Therefore, a 3D object (not shown) printed by the printer 1 can have specific colors based on users' demand.

As mentioned above, the printer 1 must be arranged with both the 3D nozzle 111 and the 2D pen-module 112, and the 3D nozzle 111 and the 2D pen-module need to apply same printing datum, then a failure coloring can be avoided. Accordingly, an alignment action must be performed by the printer 1 in advance before a formal printing action starts.

Figure 2:
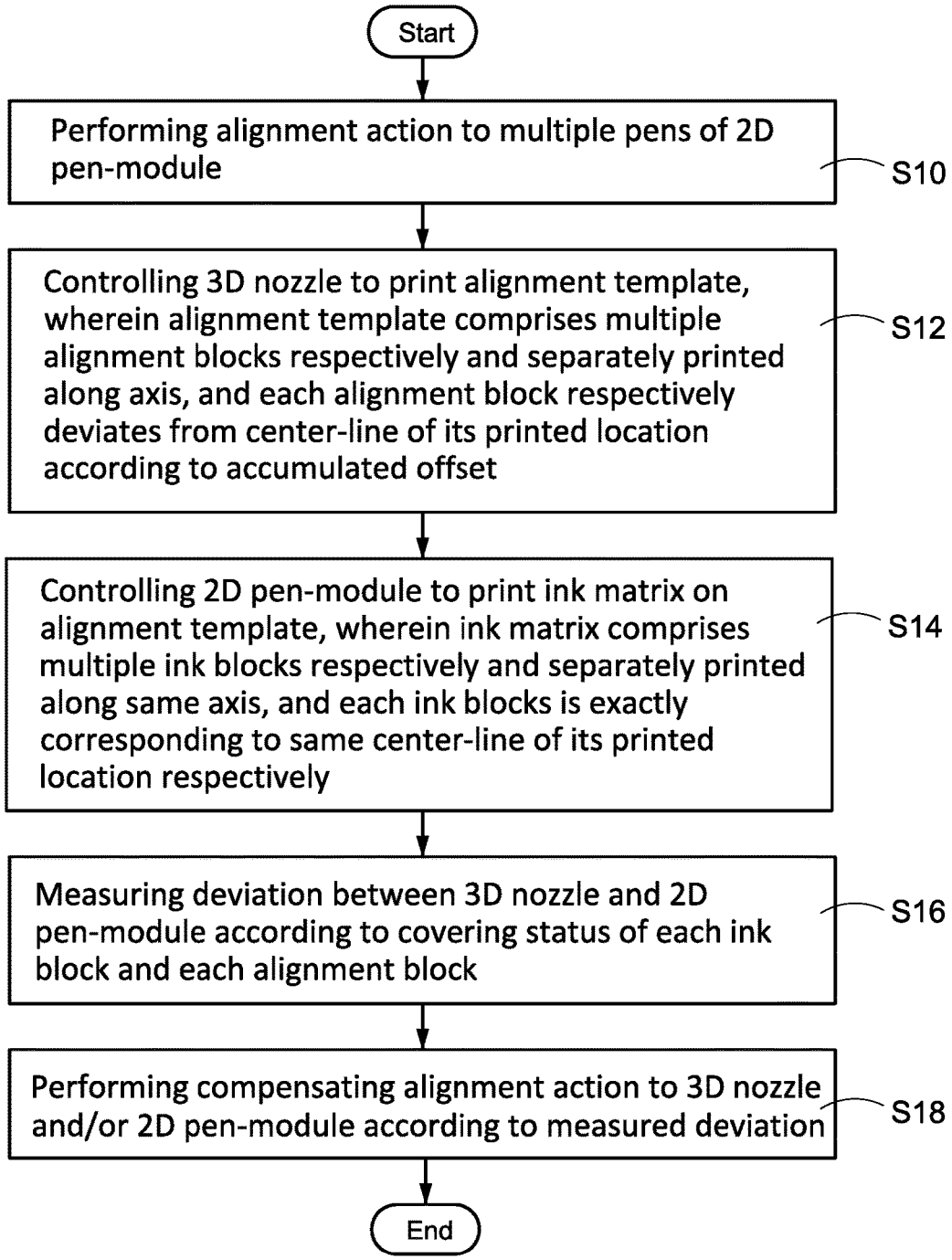
FIG. 2 is an alignment flowchart according to one embodiment of the present disclosure.

FIG. 2 is an alignment flowchart according to one embodiment of the present disclosure. In one aspect, the 2D pen-module 112 is a pen-module used to be arranged on a traditional 2D printer for jetting colored ink, which comprises at least four pens for at least four different colors of inks such as Cyan, Magenta, Yellow and Black. Accordingly, the alignment method of one aspect may perform an alignment action to the at least four pens (not shown) of the 2D pen-module 112 in advance before performing other alignment action to the 3D nozzle 111 and the 2D pen-module 112 (step S10), so as to keep the at least four pens to locate at same printing datum. However, the alignment action for these pens may be any well-known means of related art, thus, no more discussion is needed here.

After the step S10, the printer 1 controls the 3D nozzle 111 to print an alignment template on the printing platform 12 (as the alignment template 2 shown in FIG. 3A), wherein the alignment template 2 comprises multiple alignment blocks (as the alignment block 24 shown in FIG. 3A) which are respectively and separately printed along at least one axis (such as X axis or Y axis), and each of the alignment blocks 24 respectively deviates from a center-line of its printed location according to an accumulated offset (step S12).

After the alignment template 2 is printed completely, the printer 1 then controls the 2D pen-module 112 to print an ink matrix on the alignment template 2 (as the ink matrix 3 shown in FIG. 3B), wherein the ink matrix 3 comprises multiple ink blocks (as the ink blocks 31 shown in FIG. 3B) which are respectively and separately printed along the same axis, and each of the ink blocks 31 is exactly corresponding to the same center-line of its printed location respectively, namely, a geometic center of the ink blocks 31 coincides with the center-line of its printed location (step S14).

Figure 3A:
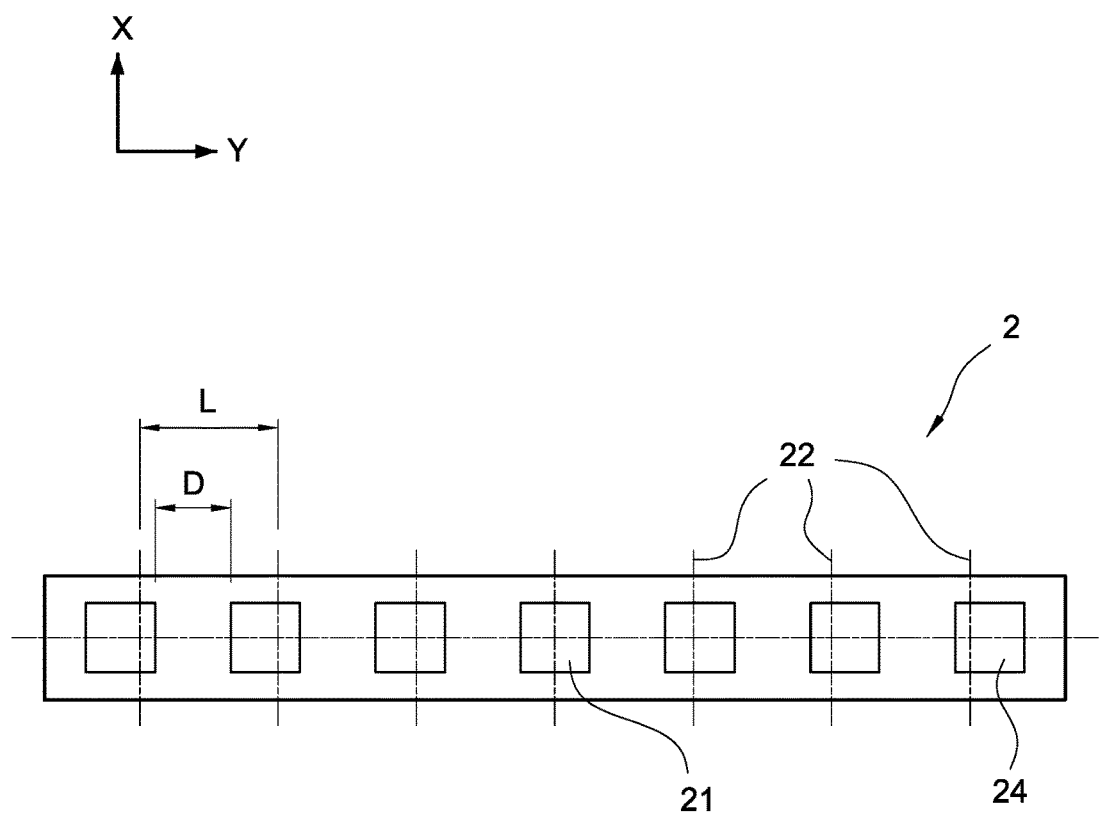
FIG. 3A is a schematic view of an alignment template according to one embodiment of the present disclosure.

With reference to FIG. 3A, FIG. 3A is a schematic view of an alignment template according to one embodiment of the present disclosure. In one aspect, the 3D nozzle 111 is first controlled to jet the material on the printing platform 12 in order to print the alignment template 2. In one of the exemplary embodiments shown in FIG. 3A, the alignment template 2 is a long-strip template, and is corresponding to one single axis (such as X axis or Y axis) of the printer 1. In one aspect, the printer 1 may perform an alignment action for aligning the nozzle set 11 upon the X axis through printing the alignment template 2 along the X axis. Also, the printer 1 may perform other alignment action for aligning the nozzle set 11 upon the Y axis through printing the alignment template 2 along the Y axis.

Figure 4A:
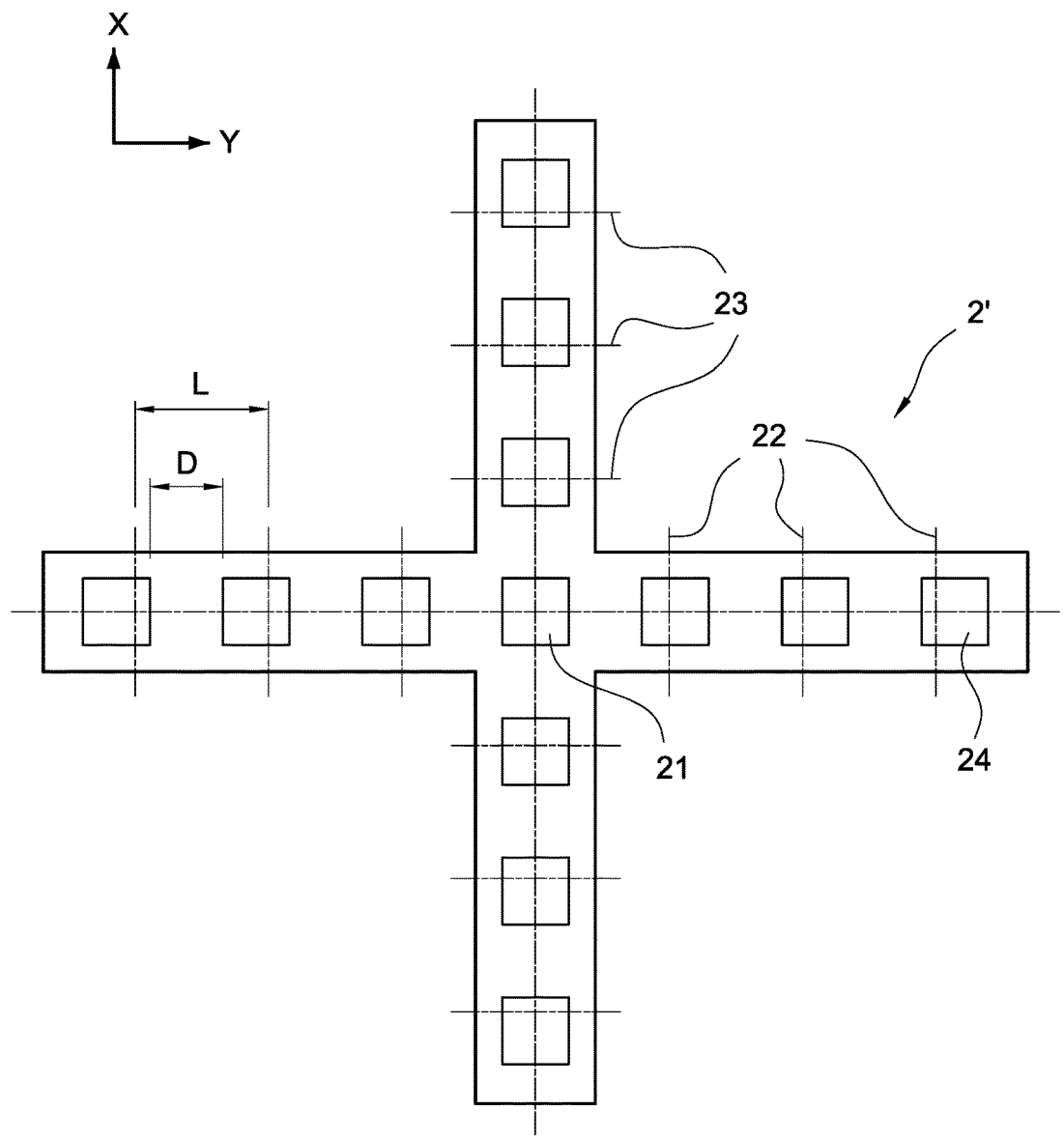
FIG. 4A is a schematic view of an alignment template according to other embodiment of the present disclosure.

With reference to FIG. 4A, FIG. 4A is a schematic view of an alignment template according to other embodiment of the present disclosure. In one of the exemplary embodiments shown in FIG. 4A, an alignment template 2' which is a cross-shape template is disclosed, and the alignment template 2' is corresponding to both the X axis and the Y axis of the printer 1. In one aspect, the printer 1 may perform an alignment action for aligning the nozzle set 11 upon both the X axis and the Y axis simultaneously through printing the alignment template 2' along the X axis and the Y axis.

In one aspect of the present disclosure, a user can decide to print the alignment template 2 or the alignment template 2', so as to alternatively select performing a single-axis orientation alignment or a multiple-axes orientation alignment to the nozzle set 11.

For other aspect of the present disclosure, if the nozzles of the nozzle set 11 malfunction, shift or cause obvious deviation between the jetted alignment template and the jetted ink matrix during printing the 3D model, the user may first control the printer 1 to stop printing the 3D model, then controls the printer 1 to print the alignment template 2 along a problematic axis (the X axis or the Y axis) after the nozzle(s) is changed or adjusted, so as to align the changed/adjusted nozzle(s) upon the problematic axis. In this embodiment, the alignment speed may increase through only aligning for one single axis, so as to reduce the printing time of the 3D model.

However, the aforementioned description is just an aspect of the present disclosure, the user may arbitrarily control the printer 1 to perform the single-axis orientation alignment or the multiple-axes orientation alignment at any time depending on his/her own demand, not limited thereto. For ease of discussion, the following descriptions will take the cross-shape alignment template 2' for examples, but not intended to limit the scope of the present invention.

As shown in FIG. 4A, the alignment template 2' comprises multiple alignment blocks 24 which are respectively and separately printed along at least one axis (the X axis or the Y axis), wherein each of the alignment blocks 24 respectively deviates from a center-line of each printed location according to an accumulated offset, and every disance between each two neighbor center-lines is the same (detailed described in the following).

In one of the exemplary embodiments shown in FIG. 4A, the alignment template 2' is a cross-shape template. The multiple alignment blocks 24 comprises a locating block 21 which is printed at a locating position of the alignment template 2', and the locating block 21 is exactly corresponding to the center-line of the locating position. Besides the locating block 21, the rest of the multiple alignment blocks 24 are respectively and separately printed from the locating block 21 and along the X axis and the Y axis. In particular, the value of the accumulated offset adopted by each of the alignment blocks 24 is directly proportional to each distance between each alignment block 24 and the locating block 21.

In one of the exemplary embodiments shown in FIG. 4A, the aforementioned center-lines comprises multiple X axis center-lines 22 which are respectively corresponding to each printed location upon the X axis and multiple Y axis center-lines 23 which are respectively corresponding to each printed location upon the Y axis. Furthermore, the offset is accumulated by 0.2 mm.

In particular, as shown in FIG. 4A, the first alignment block 24 counted from the right side of the locating block 21 and closest to the locating block 21 deviates from one of the X axis center-lines 22 of its printed location by a +0.2 mm offset, the second alignment block 24 counted from the right side of the locating block 21 deviates from one of the X axis center-lines 22 of its printed location by a +0.4 mm offset, the third alignment block 24 counted from the right side of the locating block 21 deviates from one of the X axis center-lines 22 of its printed location by a +0.6 mm offset, and so on.

On the other hand, the first alignment block 24 counted from the left side of the locating block 21 and closest to the locating block 21 deviates from one of the X axis center-lines 22 of its printed location by a −0.2 mm offset, the second alignment block 24 counted from the left side of the locating block 21 deviates from one of the X axis center-lines 22 of its printed location by a −0.4 mm offset, the third alignment block 24 counted from the left side of the locating block 21 deviates from one of the X axis center-lines 22 of its printed location by a −0.6 mm offset, and so on.

According to same concept, the first alignment block 24 upon the locating block 21 and closest to the locating block 21 deviates from one of the Y axis center-lines 23 of its printed location by a +0.2 mm offset, the second alignment block 24 upon the locating block 21 deviates from one of the Y axis center-lines 23 of its printed location by a +0.4 mm offset, the third alignment block 24 upon the locating block 21 deviates from one of the Y axis center-lines 23 of its printed location by a +0.6 mm offset, the first alignment block 24 below the locating block 21 and closest to the locating block 21 deviates from one of the Y axis center-lines 23 of its printed location by a −0.2 mm offset, the second alignment block 24 below the locating block 21 deviates from one of the Y axis center-lines 23 of its printed location by a −0.4 mm offset, the third alignment block 24 below the locating block 21 deviates from one of the Y axis center-lines 23 of its printed location by a −0.6 mm offset, and so on.

As mentioned above, the offset is accumulated by 0.2 mm in one aspect shown in FIG. 4A, but not limited thereto. In other aspect of the present disclosure, the offset may be accumulated by 0.05 mm, 0.1 mm or other number, but a maximum of the accumulated offset is less than or equal to 1 mm. In particular, if a deviation existed between the 3D nozzle 111 and the 2D pen-module 112 exceeds 1 mm, the deviation may not be compensated by the printer 1 itself through a firmware alignment action or a hardware alignment action, and the printer 1 needs to be fixed by its original factory. As a result, in one of the exemplary embodiments, the maximum of the accumulated offset is restricted to less than or equal to 1 mm, but not limited thereto.

As mentioned above, as the alignment template 2' is a cross-shape template, the printer 1 may print the alignment template 2' along with an ink matrix 3', so as to measure a deviation between the 3D nozzle 111 and the 2D pen-module 112 on both the X axis and the Y axis. For reaching this goal, each of the multiple alignment blocks 24 on the X axis needs to be respectively corresponding to each of the X axis center-lines 22 of each printed location, and each of the alignment blocks 24 on the Y axis needs to be respectively corresponding to each of the Y axis center-lines 23 of each printed location. In one aspect, a distance between each two neighbor X axis center-lines 22 is equal to the aforementioned distance L, and a distance between each two neighbor Y axis center-lines 23 is also equal to the aforementioned distance L. Besides, a distance between each two neighbor alignment blocks 24 (including the alignment blocks 24 on both the X axis and the Y axis) is equal to a distance D as shown in FIG. 3A and FIG. 4A.

Figure 3B:
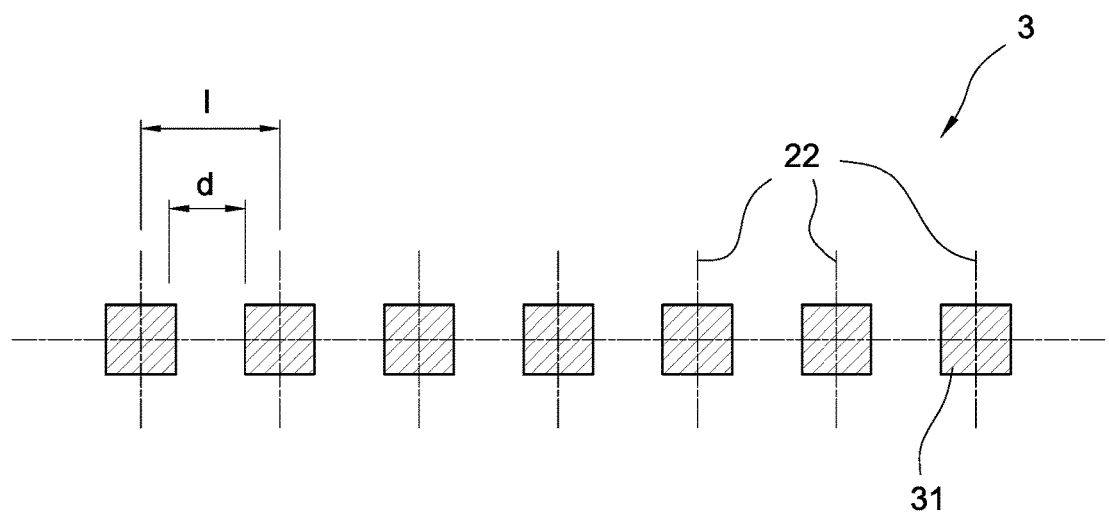
FIG. 3B is a schematic view of an ink matrix according to one embodiment of the present disclosure.
Figure 4B:
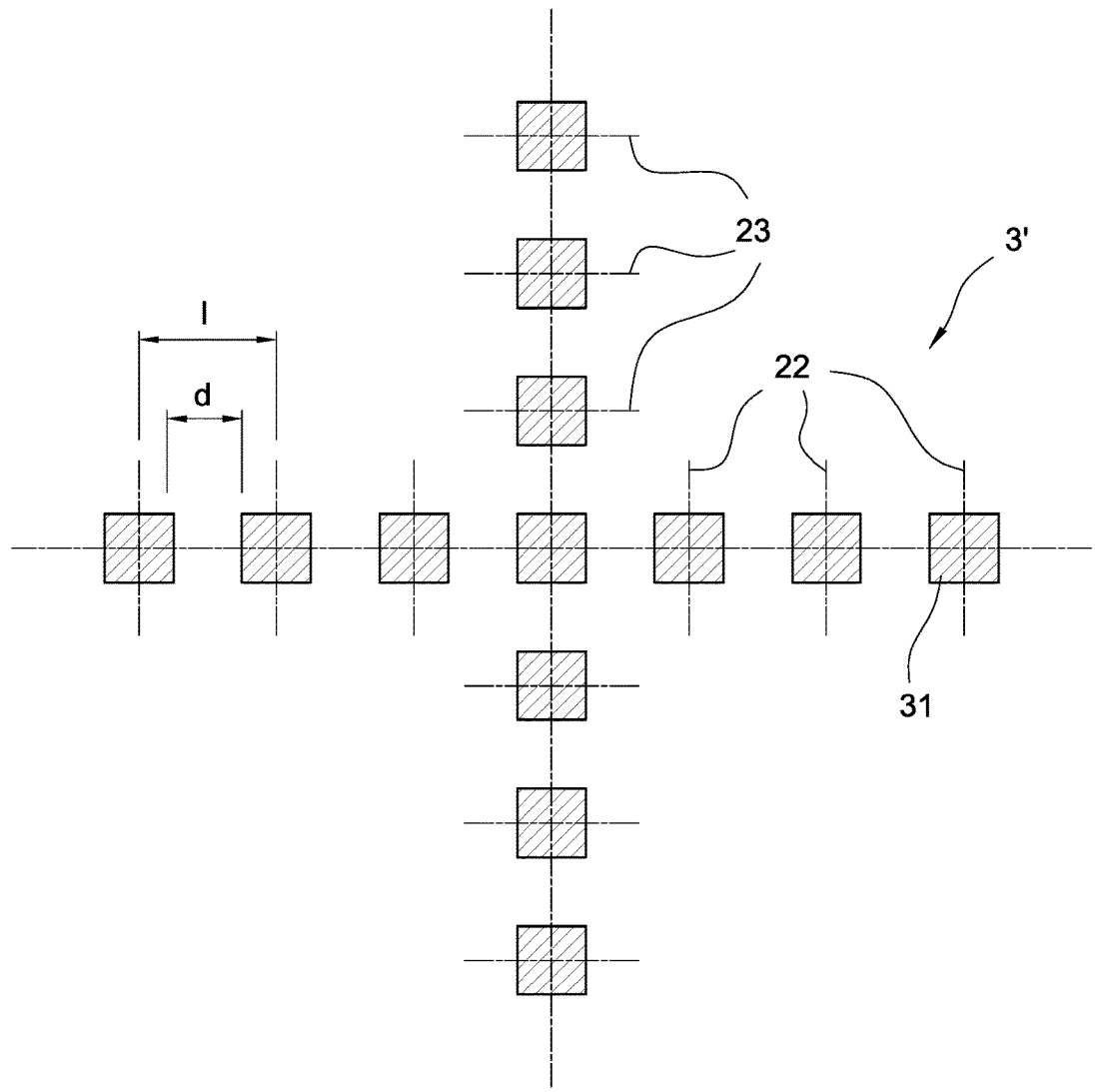
FIG. 4B is a schematic view of an ink matrix according to other embodiment of the present disclosure.

With reference to FIG. 3B and FIG. 4B, FIG. 3B is a schematic view of an ink matrix according to one embodiment of the present disclosure, and FIG. 4B is a schematic view of an ink matrix according to other embodiment of the present disclosure. In particular, if the printer 1 is to print the long-strip alignment template 2 (as shown in FIG. 3A), the printer 1 will then print a long-strip ink matrix 3 (as shown in FIG. 3B) along the same axis (such as the X axis or the Y axis), wherein the ink matrix 3 comprises multiple ink blocks 31 which are respectively corresponding to each printed location of each of the alignment blocks. If the printer 1 is to print the cross-shape alignment template 2' (as shown in FIG. 4A), the printer 1 will then print a cross-shape ink matrix 3' (as shown in FIG. 4B), and the ink matrix 3' comprises multiple ink blocks 31 which are respectively corresponding to each printed location of each of the alignment blocks 24. For ease of discussion, the cross-shape ink matrix 3' will be taken into account as an example in the following, but not limited thereto.

After the alignment template 2' is printed completely, the printer 1 then controls the 2D pen-module 112 to print the ink matrix 3' on the printed alignment template 2', wherein the ink matrix 3' comprises multiple ink blocks 31 which are respectively and separately printed along the same axis (i.e., the X axis and the Y axis). It should be noted that the 2D pen-module 112 is to print the multiple ink blocks 31 directly on the printed locations as the same as the multiple alignment blocks 24, so each of the ink blocks 31 is respectively corresponding to each center-line same as each of the alignment blocks 24 on the same printed location (i.e., the X axis center-line 22 and the Y axis center-line 23), and each of the ink blocks 31 is respectively corresponding to the same center-line, to which each of the alignment blocks 24 is also corresponding on the same printed location.

The difference between the multiple ink blocks 31 and the multiple alignment blocks 24 is that each of the ink blocks 31 is exactly corresponding to the corresponding center-line of its printed location (the ink block 31 printed along the X axis is corresponding to the X axis center-line 22 of its printed location, and the ink block 31 printed along the Y axis is corresponding to the Y axis center-line 23 of its printed location), and the ink blocks 31 do not have the offset. In one aspect, the size and the shape of the ink blocks 31 are as the same as that of the alignment blocks 24.

As shown in FIG. 4B, in one embodiment, a distance between each two neighbor center-lines is equal to a distance l, and the distance l is equal to the aforementioned distance L as shown in FIG. 4A. Besides, a distance between each two neighbor ink blocks 31 is equal to a distance d, and the distance d is less than the aforementioned distance D as shown in FIG. 4A. In particular, a difference value between the distance d and the distance D is equal to a minimum of the offset (for example, the minimum of the offset is 0.2 mm in the one of the exemplary embodiments shown in FIG. 3B).

With reference to FIG. 2 again, after the alignment template 2' and the ink matrix 3' are printed completely, the print 1 measures a deviation between the 3D nozzle 111 and the 2D pen-module 112 according to a covering status of each of the ink blocks 31 and each of the alignment blocks 24 (step S16), therefore, the printer 1 may then perform a compensating alignment action to the 3D nozzle 111 and/or the 2D pen-module 112 according to the measured deviation (step S18), so as to keep the 3D nozzle 111 and the 2D pen-module 112 to locate at same printing datum. As a result, the printer 1 is assured to perform a coloring action on the printed object correctly and precisely.

It should be noted that in one aspect, the printer 1 may perform the aforementioned alignment action through executing a firmware-based alignment action (for example, to amend initial coordinates adopted by the 3D nozzle 111 or the 2D pen-module 112 upon the printing platform 12), and may also perform the aforementioned alignment action through executing a hardware-based alignment action (for example, to physically and directly adjust an arranged position of the 3D nozzle 111 or the 2D pen-module 112 upon a control arm (not shown)), but not limited thereto.

Figure 5:
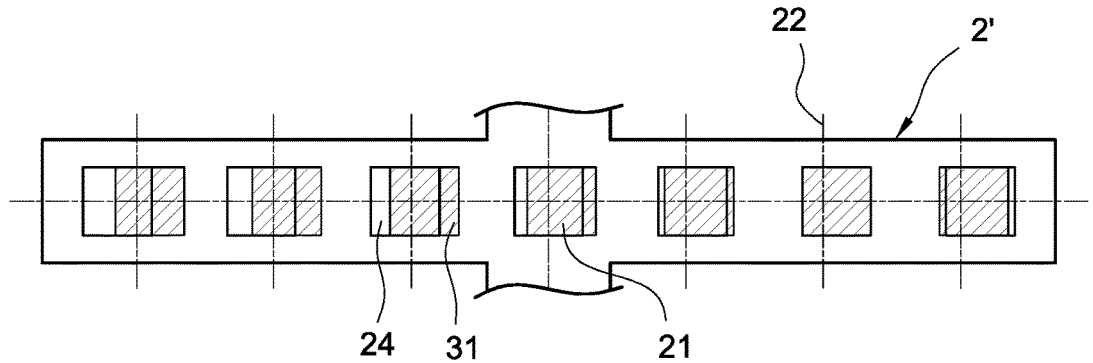
FIG. 5 is a schematic view showing a covering status according to one embodiment of the present disclosure.

With reference to FIG. 5, FIG. 5 is a schematic view showing a covering status according to one embodiment of the present disclosure. As shown in FIG. 5, the size and the shape of the alignment blocks 24 and the ink blocks 31 are the same. In one aspect, the shape of each of the alignment blocks 24 and each of the ink blocks 31 is square for an example, but not intended to limit the scope of the present invention. In one of the exemplary embodiments, the printer 1 is to measure the deviation between the 3D nozzle 111 and the 2D pen-module 112 according to the offset adopted by one of the alignment blocks 24 which is completely covered by the corresponding ink block 31 printed on same printed location.

In particular, each ink block 31 and each corresponding alignment block 24 are printed on same printed location, and are respectively corresponding to the same center-line of the printed location (the X axis center-line 22 or the Y axis center-line 23). However, each of the alignment blocks 24 respectively deviates from each of the center-lines of each printed location according to the accumulated offset, and each of the ink blocks 31 is exactly corresponding to each of the center-lines of each printed location. As a result, there is no way that all of the alignment blocks 24 are completely covered by the corresponding ink block 31 on the same printed location after the 2D pen-module 112 completes printing the ink matrix 3 or 3' on the alignment template 2 or 2'.

As shown in FIG. 5, the second alignment block 24 from the right side of the locating block 21 upon the X axis is completely covered by the corresponding ink block 31 on the same printed location, and the offset (which is the aforementioned accumulated offset) adopted by this alignment block 24 is +0.4 mm. Therefore, the printer 1 measures the deviation between the 3D nozzle 111 and the 2D pen-module 112 upon the X axis is +0.4 mm. Accordingly, if the printer 1 wants to keep the 3D nozzle 111 and the 2D pen-module 112 to locate at same printing datum, it needs to perform an alignment action to the 3D nozzle 111 and/or the 2D pen-module 112 for compensating the deviation by +0.4 mm.

Figure 6:
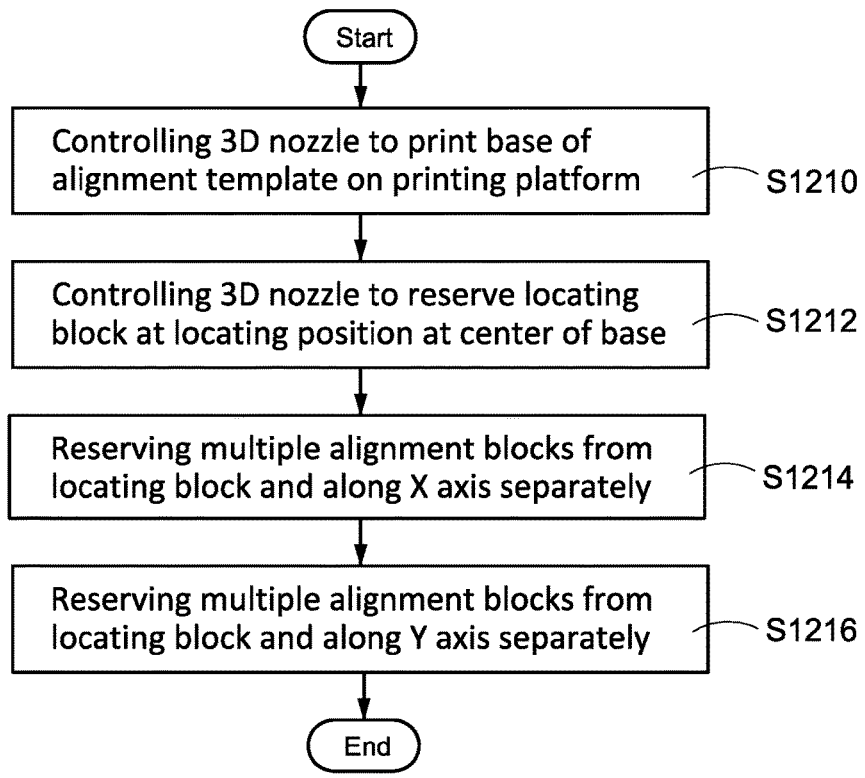
FIG. 6 is a flowchart for printing an alignment template according to one embodiment of the present disclosure.
Figure 7:
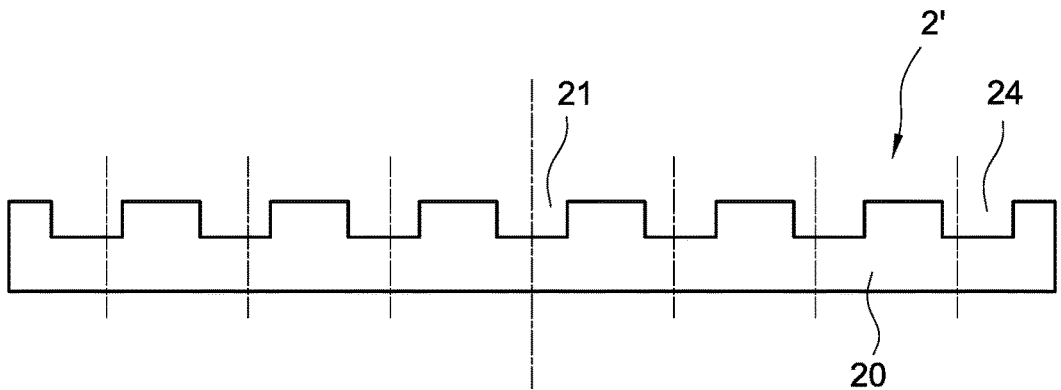
FIG. 7 is a schematic view of an alignment template according to other embodiment of the present disclosure.

With reference to FIG. 6 and FIG. 7, FIG. 6 is a flowchart for printing an alignment template according to one embodiment of the present disclosure, and FIG. 7 is a schematic view of an alignment template according to other embodiment of the present disclosure. As shown in FIG. 7, in one of the exemplary embodiments, the multiple alignment blocks 24 are concave. When printing the alignment template 2', the 3D nozzle 111 is to respectively reserve a concave at each printed location so as to form the multiple alignment blocks 24. Also, the 2D pen-module 112 is to respectively jet ink into each concave so as to form the multiple ink blocks 31.

According to one embodiment as shown in FIG. 6, when printing the alignment template 2', the printer 1 first controls the 3D nozzle 111 to print a base 20 of the alignment template 2' on the printing platform 12 (step S1210), wherein the base 20 is a cross-shape base. During printing the base 20, the 3D nozzle 111 is controlled to reserve the locating block 21 at the locating position at the center of the base 20 (step S1212), wherein the locating block 21 is exact corresponding to the center-line of the locating position. Next, the 3D nozzle 111 separately reserves the multiple alignment blocks 24 from the locating block 21 and along the X axis (as X axis alignment block in this aspect) (step S1214), wherein each of the X axis alignment blocks respectively deviates from each of the X axis center-lines 22 of each printed location according to the accumulated offset, and distances (i.e., the aforementioned distance D) between each two neighbor X axis alignment blocks are the same.

Also, the 3D nozzle 111 separately reserves the multiple alignment blocks 24 from the locating block 21 and along the Y axis (as Y axis alignment block at this aspect) (step S1216), wherein each of the Y axis alignment blocks respectively deviates from each of the Y axis center-lines 23 of each printed location according to the accumulated offset, and distances between each two neighbor Y axis alignment blocks are the same.

It should be noted that the flowchart of FIG. 6/FIG. 7 may also be used to print the long-strip alignment template 2. Since the long-strip alignment template 2 is only corresponding to one single axis (the X axis or the Y axis), when printing the alignment template 2 according to the flowchart of FIG. 6, the printer 1 will print the base 20 in a long-strip at the step S1210. After the step S1210, the printer 1 will alternatively execute one of the step S1214 and the step S1216.

Figure 8:
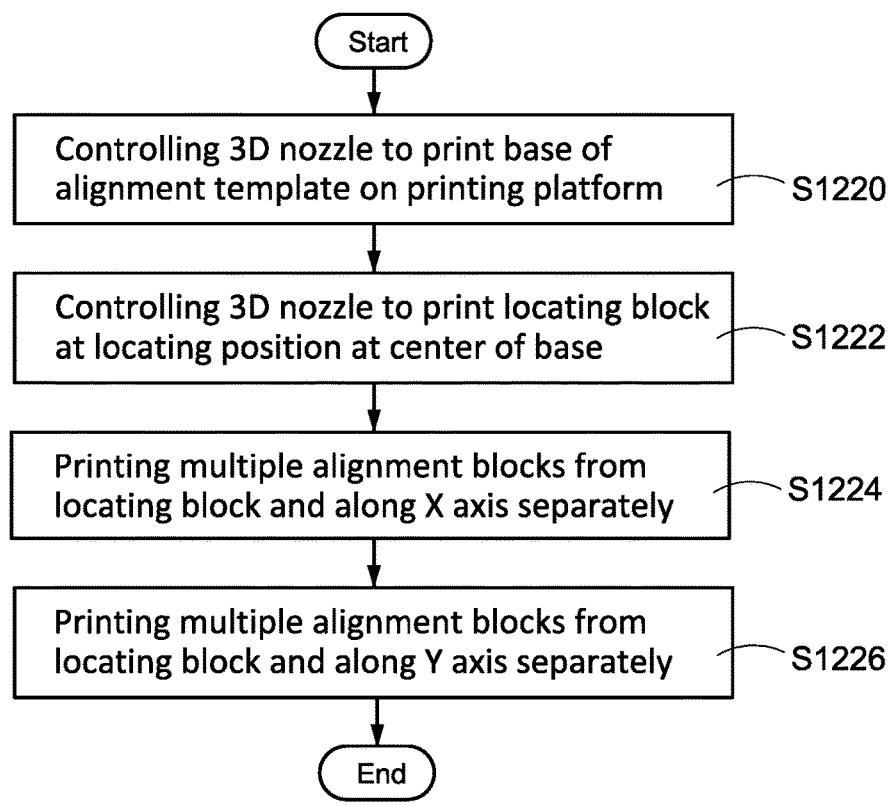
FIG. 8 is a flowchart for printing an alignment template according to other embodiment of the present disclosure.
Figure 9:
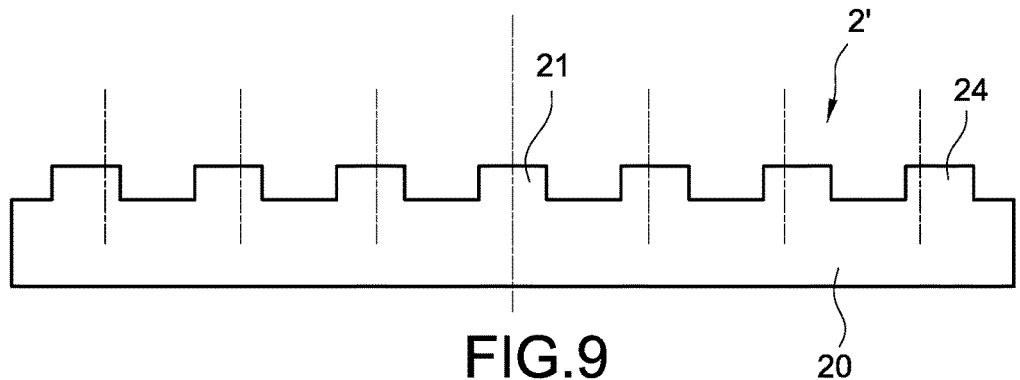
FIG. 9 is a schematic view of an alignment template according to other embodiment of the present disclosure.

With reference to FIG. 8 and FIG. 9, FIG. 8 is a flowchart for printing an alignment template according to other embodiment of the present disclosure, and FIG. 9 is a schematic view of an alignment template according to other embodiment of the present disclosure. The difference between the embodiment shown in FIG. 8/FIG. 9 and the other embodiment shown in FIG. 6/FIG. 7 is that the multiple alignment blocks 24 is this embodiment are protruding bumps. When printing the alignment template 2', the 3D nozzle 111 is to respectively print a protruding bump at each printed location so as to form the multiple alignment blocks 24. Also, the 2D pen-module 112 is to respectively jet ink on surface of each of the protruding bumps so as to form the multiple ink blocks 31.

According to one embodiment as shown in FIG. 8, when printing the alignment template 2', the printer 1 first controls the 3D nozzle 111 to print a base 20 of the alignment template 2' on the printing platform 12 (step S1220), wherein the base 20 is a cross-shape base. During printing the base 20, the 3D nozzle 111 is controlled to print the locating block 21 at the locating position at the center of the base 20 (step S1222), wherein the locating block 21 is exactly corresponding to the center-line of the locating position. Next, the 3D nozzle 111 separately prints the multiple alignment blocks 24 from the locating block 21 and along the X axis (as X axis alignment block in this aspect) (step S1224), wherein each of the X axis alignment blocks respectively deviates from each of the X axis center-lines 22 of each printed location according to the accumulated offset, and distances (i.e., the aforementioned distance D) between each two neighbor X axis alignment blocks are the same.

Also, the 3D nozzle 111 separately prints the multiple alignment blocks 24 from the locating block 21 and along the Y axis (as Y axis alignment block at this aspect) (step S1226), wherein each of the Y axis alignment blocks respectively deviates from each of the Y axis center-lines 23 of each printed location according to the accumulated offset, and distances between each two neighbor Y axis alignment blocks are the same.

As the same as FIG. 6, the flowchart of FIG. 8 may also be used to print the long-strip alignment template 2. Since the long-strip alignment template 2 is only corresponding to one single axis (the X axis or the Y axis), when printing the alignment template 2 according to the flowchart of FIG. 8, the printer 1 will print the base 20 in a long-strip at the step S1220. After the step S1220, the printer 1 will alternatively execute one of the step S1224 and the step S1226.

In particular, using the concaves as the alignment blocks 24 of the alignment template 2 or 2' needs less material, in this aspect the printer 1 will have short printing time and low alignment cost. On the other hand, it may show the deviation between the alignment blocks 24 and the ink blocks 31 (i.e., the deviation between the 3D nozzle 111 and the 2D pen-module 112) more obvious if using the protruding bumps as the alignment blocks 24 and prints the ink blocks 31 on the surface of the protruding bumps respectively. As such, both the aforementioned embodiments have their own benefit, and the present invention is not intended to be restricted to anyone of them.

In the aforementioned embodiments, the printer 1 is to print the alignment template 2 or 2' with the accumulated offset through the 3D nozzle 111 and to print the ink matrix 3 or 3' without the offset though the 2D pen-module 112. However, in other one of the exemplary embodiments, the printer 1 may also control the 3D nozzle 111 to print other alignment template without the offset, and controls the 2D pen-module 112 to print other ink matrix with the accumulated offset, either way may measure the deviation between the 3D nozzle 111 and the 2D pen-module 112 according to the covering status of the alignment blocks 24 and the ink blocks 31 being printed on the same printed location, so as to achieve the goal for aligning the printer 1.

Figure 10:
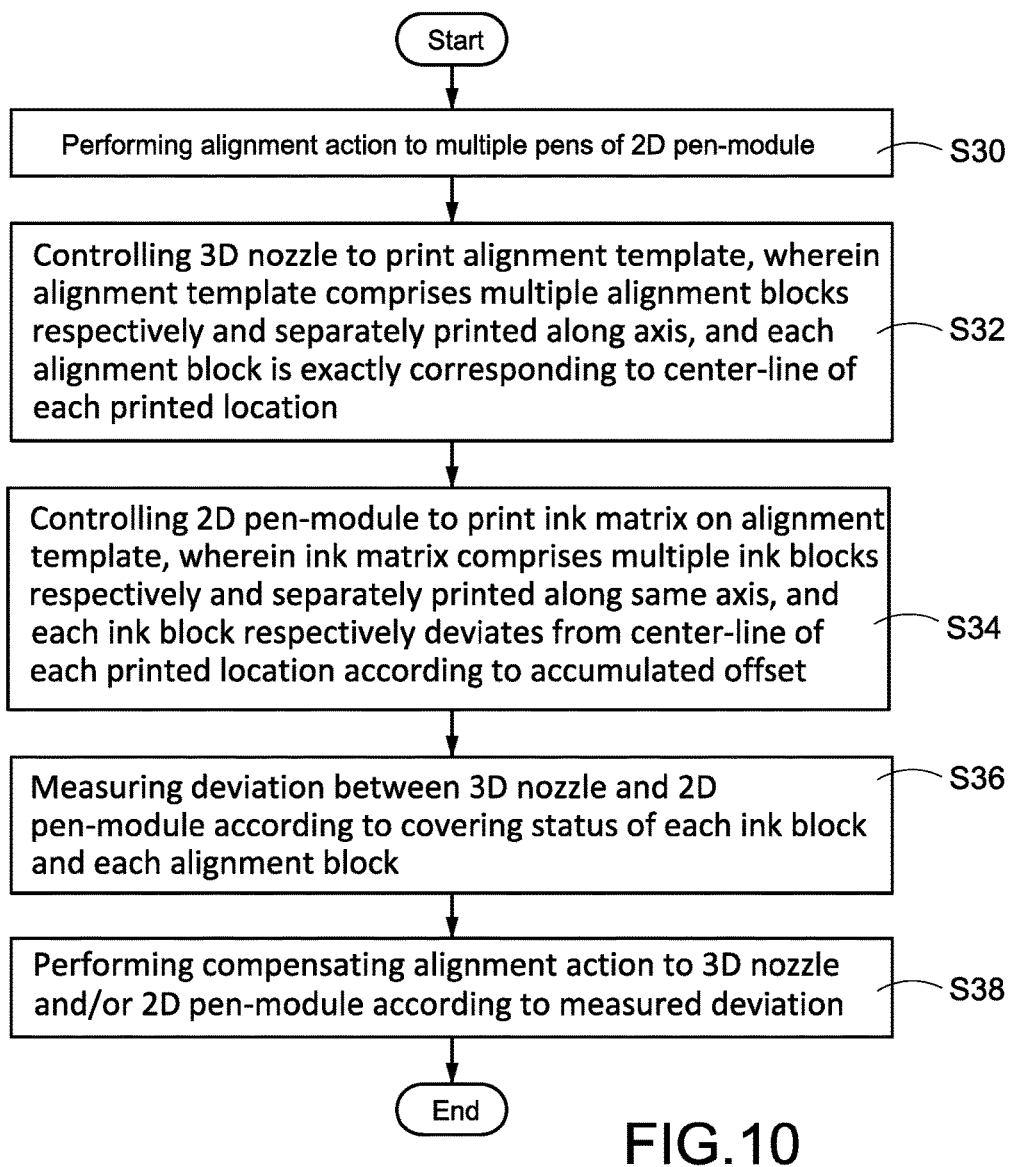
FIG. 10 is an alignment flowchart according to other embodiment of the present disclosure.

FIG. 10 is an alignment flowchart according to other embodiment of the present disclosure. FIG. 10 discloses other alignment method adopted by the printer 1 as shown in FIG. 1. In one aspect, the printer 1 first performs an alignment action to the multiple pens of the 2D pen-module 112 (step S30), so as to keep the multiple pens to locate at same printing datum. In one of the exemplary embodiments, the multiple pens comprises at least four pens respectively arranged with different colors of ink cartridges such as Cyan, Magenta, Yellow and Black, but not limited thereto.

Next, the printer 1 controls the 3D nozzle 111 to print an alignment template on the printing platform 12 (step S32). In one aspect of FIG. 10, the alignment template comprises multiple alignment blocks which are respectively and separately printed along at least one axis (only the X axis, only the Y axis, or both the X axis and the Y axis), wherein each of the alignment blocks is exactly corresponding to one center-line of each printed location (such as one of the X axis center-lines 22 and one of the Y axis center-lines 23 shown in FIG. 4A), and distances between each two neighbor center-lines are the same. That is to say, the 3D nozzle 111 in this embodiment is not to print offset-adopted alignment blocks like mentioned above. In this embodiment, the printed locations of the multiple alignment blocks are as the same as the printed locations of the multiple ink blocks 31 as shown in FIG. 4B.

After the alignment template is printed completely, the printer 1 further controls the 2D pen-module 112 to print an ink matrix on the alignment template (step S34). In one aspect of FIG. 10, the ink matrix comprises multiple ink blocks which are respectively and separately printed along the same axis (only the X axis, only the Y axis, or both the X axis and the Y axis), wherein each of the ink blocks respectively deviates from the center-line of each printed location (such as one of the X axis center-lines 22 and one of the Y axis center-lines 23 shown in FIG. 4A) according to an accumulated offset, and the size and the shape of the ink blocks and the alignment blocks are the same. That is to say, the 2D pen-module in this embodiment is to print the offset-adopted ink blocks, and the printed locations of the multiple ink blocks are as the same as the printed locations of the multiple alignment blocks 24 shown in FIG. 4A.

After the alignment template and the ink matrix are printed completely, the printer 1 measures a deviation between the 3D nozzle 111 and the 2D pen-module 112 according to the covering status of each of the ink blocks and each of the alignment blocks (step S36). Next, the printer 1 performs a compensating alignment action to the 3D nozzle 111 and/or the 2D pen-module 112 according to the measured deviation (step S38), so as to keep the 3D nozzle 111 and the 2D pen-module to locate at same printing datum.

In particular, during the aforementioned step S36, the printer 1 uses the accumulated offset adopted by one of the ink blocks which completely covers the corresponding alignment block of the same printed location to determine the deviation (i.e., the determined deviation is equal to the adopted offset), and the measuring method is as similar as the way shown in FIG. 5.

The approach of this embodiment is opposite to the aforementioned embodiments shown in FIG. 3A, FIG. 3B, FIG. 4A and FIG. 4B. In particular, in this embodiment, the multiple ink blocks comprises a locating block which is exactly corresponding to the center-line of a locating position of the alignment template, and the rest of the ink blocks are respectively and separately printed from the locating block and along the same axis (such as the X axis or the Y axis), and the value of the accumulated offset adopted by each of the ink blocks is directly proportional to each distance between each ink block and the locating block. In other words, this embodiment changes the offset-adopted blocks from the aforementioned alignment blocks 24 into the multiple ink blocks, and the deviating rule is similar.

Furthermore, the alignment template in this embodiment may be the cross-shape template which corresponds to both the X axis and the Y axis. When executing printing, the 3D nozzle 111 is to respectively and separately print the multiple alignment blocks along the X axis without the accumulated offset, and respectively and separately print the multiple alignment blocks along the Y axis without the accumulated offset, wherein the alignment blocks in this embodiment may be concaves or protruding bumps.

After the alignment template is printed completely, the 2D pen-module 112 first print the locating block on the locating position at the center of the alignment template, then separately prints the multiple ink blocks with the accumulated offset from the locating position and along the X axis, and also separately prints the multiple ink blocks with the accumulated offset from the locating position and along the Y axis. It should be mentioned that each of the ink blocks upon the X axis respectively deviates from each X axis center-line 22 of each printed location according to the accumulated offset, and each of the ink blocks upon the Y axis respectively deviates from each Y axis center-line 23 of each printed location according to the accumulated offset.

In this embodiment, distances between each two neighbor alignment blocks are the same, and distances between each two neighbor ink blocks are also the same. In one aspect, the offset is accumulated by 0.05 mm, 0.1 mm or 0.2 mm, and the maximum of the accumulated offset is less than or equal to 1 mm. Besides, the multiple alignment blocks in this embodiment are not adopted with the offset, and the multiple ink blocks in this embodiment are adopted with the offset, so the distances between each two neighbor ink blocks are bigger than the distances between each two neighbor alignment blocks.

By way of the approach of the present disclosure, the printer 1 may measure the deviation between the 3D nozzle 111 and the 2D pen-module 112 precisely through checking the printed alignment template and ink matrix directly, so as to perform the alignment action before physical printing, and avoids the printer 1 from failure of coloring of the printed object.

As the skilled person will appreciate, various changes and modifications can be made to the described embodiment. It is intended to include all such variations, modifications and equivalents which fall within the scope of the present invention, as defined in the accompanying claims.

What is claimed is:

1. An alignment method for 3D printer, adopted by a 3D printer comprising a 3D nozzle and a 2D pen-module, the alignment method comprising:
   a) controlling the 3D nozzle to jet material for printing an alignment template on a printing platform, wherein the alignment template comprises multiple alignment blocks formed by the material which are respectively and separately printed along at least one axis, and each of the alignment blocks respectively deviates from a center-line of each printed location according to an accumulated offset, and distances between each two neighbor center-lines are the same;
   b) controlling the 2D pen-module to jet ink for printing an ink matrix on the alignment template, wherein the ink matrix comprises multiple ink blocks formed by the ink which are respectively and separately printed along same axis, and each of the ink blocks is exactly corresponding to the center-line of each printed location, and size and shape of each of the ink blocks are equal to size and shape of the alignment blocks;
   c) determining a deviation between the 3D nozzle and the 2D pen-module according to covering status of each ink block and each corresponding alignment block at each printed location; and
   d) performing a compensating alignment action to the 3D nozzle or the 2D pen-module according to the determined deviation so as to keep the 3D nozzle and the 2D pen-module to locate at a same printing datum.

2. The alignment method in claim 1, wherein the step c is to measure the deviation according to the offset adopted by one of the alignment bocks that is completely covered by the corresponding one of the ink blocks on the same printed location.

3. The alignment method in claim 2, wherein the shape of each of the alignment blocks and each of the ink blocks are square.

4. The alignment method in claim 2, wherein the multiple alignment blocks comprise a locating block that is exactly corresponding to the center-line of a locating position of the alignment template, and rest of the alignment blocks are respectively and separately printed from the locating block and along the axis, and a value of the accumulated offset adopted by each of the alignment blocks is directly proportional to each distance between each alignment block and the locating block.

5. The alignment method in claim 4, wherein the offset is accumulated by 0.05 mm, 0.1 mm or 0.2 mm, and a maximum of the accumulated offset is less than or equal to 1 mm.

6. The alignment method in claim 4, wherein distances between each two neighbor alignment blocks are the same, distances between each two neighbor ink blocks are the same, and the distances between each of the ink blocks are less than the distances between each of the alignment blocks.

7. The alignment method in claim 4, wherein the alignment template is a cross-shape template, and the multiple alignment blocks comprise multiple X axis alignment blocks which are respectively and separately printed from the locating block and along the X axis, and multiple Y axis alignment blocks which are respectively and separately printed from the locating block and along the Y axis, wherein each of the X axis alignment blocks respectively deviates from the X axis center-line of each printed location according to the accumulated offset, and each of the Y axis alignment blocks respectively deviates from the Y axis center-line of each printed location according to the accumulated offset.

8. The alignment method in claim 7, wherein the multiple alignment blocks are concave, and the step a further comprises following steps of:
   a11) controlling the 3D nozzle to print a base of the alignment template on the printing platform;
   a12) reserving the locating block on the locating position at a center of the base;
   a13) reserving the multiple X axis alignment blocks separately from the locating block and along the X axis, wherein distances between each two neighbor X axis alignment blocks are the same; and
   a14) reserving the multiple Y axis alignment blocks separately from the locating block and along the Y axis, wherein distances between each two neighbor Y axis alignment blocks are the same.

9. The alignment method in claim 7, wherein the multiple alignment blocks are protruding bumps, and the step a further comprises following steps of:
   a11) controlling the 3D nozzle to print a base of the alignment template on the printing platform;
   a12) printing the locating block on the locating position at a center of the base;
   a13) printing the multiple X axis alignment blocks separately from the locating block and along the X axis, wherein distances between each two neighbor X axis alignment blocks are the same; and
   a14) printing the multiple Y axis alignment blocks separately from the locating block and along the Y axis, wherein distances between each two neighbor Y axis alignment blocks are the same.

10. The alignment method in claim 2, wherein the 2D pen-module comprises at least four pens for at least four different colors of inks comprising Cyan, Magenta, Yellow and Black, and a step a0 is further comprised before the step a: performing an alignment action to the at least four pens of the 2D pen-module for keeping the at least four pens to locate at same printing datum.

11. An alignment method for 3D printer, adopted by a 3D printer comprising a 3D nozzle and a 2D pen-module, the alignment method comprising:
   a) controlling the 3D nozzle to jet material for printing an alignment template on a printing platform, wherein the alignment template comprises multiple alignment blocks formed by the material which are respectively and separately printed along at least one axis, and each of the alignment blocks is exactly corresponding to a center-line of each printed location, and distances between each two neighbor center-lines are the same;
   b) controlling the 2D pen-module to jet ink for printing an ink matrix on the alignment template, wherein the ink matrix comprises multiple ink blocks formed by the ink which are respectively and separately printed along same axis, and each of the ink blocks respectively deviates from the center-line of each printed location according to an accumulated offset, and size and shape of each of the ink blocks are equal to size and shape of the alignment blocks;

c) determining a deviation between the 3D nozzle and the 2D pen-module according to covering status of each ink block and each corresponding alignment block at each printed location; and d) performing a compensating alignment action to the 3D nozzle or the 2D pen-module according to the determined deviation so as to keep the 3D nozzle and the 2D pen-module to locate at a same printing datum.

12. The alignment method in claim 11, wherein the step c is to measure the deviation according to the offset adopted by one of the ink bocks which completely covers the corresponding one of the alignment blocks on same printed location.

13. The alignment method in claim 12, wherein the multiple ink blocks comprises a locating block that is exactly corresponding to the center-line of a locating position of the alignment template, and rest of the ink blocks are respectively and separately printed from the locating block and along the axis, and a value of the accumulated offset adopted by each of the ink blocks is directly proportional to each distance between each ink block and the locating block.

14. The alignment method in claim 13, wherein the alignment template is a cross-shape template, and the multiple ink blocks comprise multiple X axis ink blocks which are respectively and separately printed from the locating block and along a X axis, and multiple Y axis ink blocks which are respectively and separately printed from the locating block and along a Y axis, wherein each of the X axis ink blocks respectively deviates from a X axis center-line of each printed location according to the accumulated offset, and each of the Y axis ink blocks respectively deviates from a Y axis center-line of each printed location according to the accumulated offset.

15. The alignment method in claim 13, wherein the offset is accumulated by 0.05 mm, 0.1 mm or 0.2 mm, and a maximum of the accumulated offset is less than or equal to 1 mm, wherein distances between each two neighbor alignment blocks are the same, distances between each two neighbor ink blocks are the same, and the distances between each of the ink blocks are bigger than the distances between each of the alignment block.

* * * * *